(12) United States Patent
Yoon et al.

(10) Patent No.: US 12,456,744 B2
(45) Date of Patent: Oct. 28, 2025

(54) INSERT FOR CELL FRAME INTEGRATED WITH ADHESIVE FILM AND METHOD OF MANUFACTURING CELL FRAME USING THE SAME

(71) Applicants: Hyundai Motor Company, Seoul (KR); Kia Corporation, Seoul (KR)

(72) Inventors: Ye Jin Yoon, Gyeonggi-do (KR); Byeong-Heon Jeong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 605 days.

(21) Appl. No.: 17/729,720

(22) Filed: Apr. 26, 2022

(65) Prior Publication Data

US 2023/0089216 A1    Mar. 23, 2023

(30) Foreign Application Priority Data

Sep. 23, 2021    (KR) .................. 10-2021-0125667

(51) Int. Cl.
*H01M 8/1004* (2016.01)
*C09J 7/00* (2018.01)
*H01M 4/88* (2006.01)
*H01M 8/0273* (2016.01)
*H01M 8/1018* (2016.01)

(52) U.S. Cl.
CPC ............ *H01M 8/1004* (2013.01); *C09J 7/00* (2013.01); *H01M 4/8807* (2013.01); *H01M 4/881* (2013.01); *H01M 4/8896* (2013.01); *H01M 8/0273* (2013.01); *H01M 8/1018* (2013.01); *H01M 2300/0082* (2013.01); *H01M 2300/0085* (2013.01)

(58) Field of Classification Search
CPC ............. H01M 8/1004; H01M 8/0273; H01M 8/0247; H01M 4/8807; H01M 8/1018; H01M 4/881; H01M 4/8896; C09J 2301/204; C09J 7/00
See application file for complete search history.

(56) References Cited

FOREIGN PATENT DOCUMENTS

JP        5638508 B2    12/2014
KR    2019-0080051 A     7/2019

*Primary Examiner* — Sarah A. Slifka
(74) *Attorney, Agent, or Firm* — Fox Rothschild LLP

(57) ABSTRACT

Disclosed are methods manufacturing a four-layer membrane electrode assembly integrated with an adhesive film. The methods include a step of preparing a three-layer membrane electrode assembly comprising a first electrode and a second electrode by attaching the first electrode to a first surface of an electrolyte membrane, attaching the second electrode to a second surface of the electrolyte membrane, and joining a first gas diffusion layer to the first electrode; and a step of attaching an adhesive film to the three-layer membrane electrode assembly by preparing the adhesive film by attaching an upper protective film to an upper surface of the adhesive film and a lower protective film to a lower surface of the adhesive film, removing the lower protective film, and attaching the adhesive film to an outer peripheral region of the membrane electrode assembly including the second electrode.

14 Claims, 7 Drawing Sheets

CROSS-SECTION (A-A') OF ADHESIVE FILM STRUCTURE

INSERT FOR CELL FRAME INTEGRATED WITH ADHESIVE FILM AND METHOD OF MANUFACTURING CELL FRAME USING THE SAME

CROSS REFERENCE TO RELATED APPLICATION

The present application claims priority of Korean Patent Application No. 10-2021-0125667 filed on Sep. 23, 2021, the entire contents of which is incorporated herein for all purposes by this reference.

TECHNICAL FIELD

The present invention relates to a cell frame for a fuel cell and a method of manufacturing the same. In addition, the present invention provides an insert for a cell frame including a membrane electrode assembly constituting a fuel cell (unit cell), a method of manufacturing the insert, a cell frame manufactured using the insert for a cell frame, and a method of manufacturing the cell frame.

BACKGROUND

A fuel cell is power generator that electrochemically reacts fuel in a stack and converts chemical energy of the fuel into electrical energy.

In general, a membrane electrode assembly (MEA) is positioned at an innermost side of the fuel cell (unit cell). The membrane electrode assembly includes a polymer electrolyte membrane capable of moving hydrogen cations (protons), and catalyst layers, i.e., an anode and a cathode applied onto two opposite surfaces of the electrolyte membrane to allow hydrogen and oxygen to react.

In addition, gas diffusion layers (GDLs) are stacked on outer portions of the membrane electrode assembly where the anode and the cathode are positioned. Separators are positioned at outer sides of the gas diffusion layers and each have flow paths (flow fields) for supplying fuel and discharging water produced by reactions.

To generate an output at a desired level from the fuel cell, a plurality of unit cells configured as described above are stacked in series, thereby constituting a fuel cell stack. Endplates are coupled to outermost sides of the plurality of unit cells of the fuel cell stack to support and fix the plurality of unit cells.

Meanwhile, in the related art, a membrane-electrode-gasket assembly (MEGA) made by integrating the membrane electrode assembly and gaskets has been manufactured and used to maintain sealability of the unit cells and implement convenience during a process of stacking the unit cells.

In addition, recently, an integrated frame made by integrating the gasket and an insert made by joining the membrane electrode assembly and the gas diffusion layers has been proposed.

In the related art, the integrated frame is made by joining an elastic frame and the insert with a bonding agent. However, because the integration process is performed manually, there is a need for an insert structure capable of being continuously mass-produced and a process using the insert structure.

SUMMARY

In preferred aspect, provided are methods of manufacturing an insert for a cell frame during a process of manufacturing a membrane electrode assembly, for example, by attaching an adhesive film only to a required region during a continuous process, thereby mass-producing the insert for a cell frame.

In an aspect, provided is a method of manufacturing a four-layer membrane electrode assembly integrated with an adhesive film. The method includes: a step of preparing a three-layer membrane electrode assembly comprising a first electrode and a second electrode, by attaching the first electrode to a first surface of an electrode membrane, by attaching the second electrode to a second surface of the electrolyte membrane, and joining a first gas diffusion layer to the first electrode; and step of attaching an adhesive film to the three-layer membrane electrode assembly by preparing the adhesive film by attaching an upper protective film to an upper surface of the adhesive film and a lower protective film to a lower surface of the adhesive film; removing the lower protective film, and attaching the adhesive film to an outer peripheral region of the membrane electrode assembly including the second electrode. In particular, the adhesive film includes a non-adhesive region provided at an inner side thereof, and an adhesive region provided outside the non-adhesive region, and the upper protective film includes a first upper protective film provided at an inner side, and a second upper protective film provided outside the first upper protective film based on a cutting line.

The joining the first gas diffusion layer may include: supplying the three-layer membrane electrode assembly from a first unwinder around which a raw material of the three-layer membrane electrode assembly is wound, and supplying the first gas diffusion layer from a second unwinder around which a raw material of the first gas diffusion layer is wound; applying a binder onto the first gas diffusion layer supplied from the second unwinder; and joining the first gas diffusion layer and the three-layer membrane electrode assembly by a first compression roller.

The step of attaching the adhesive film to the step may include: supplying the adhesive film from a third unwinder around which a raw material of the adhesive film is wound; removing the lower protective film from the raw material of the adhesive film supplied from the third unwinder and transferring the adhesive film to a second compression roller; and attaching, by the second compression roller, the adhesive film, from which the lower protective film is removed, to an outer peripheral region of the membrane electrode assembly including the second electrode.

The non-adhesive region and the adhesive region may be partially exposed when the first upper protective film is removed.

The raw material of the adhesive film may be wound and prepared in a state in which the lower protective film is exposed to the outside of the third unwinder so that the upper protective film is hidden inside the raw material of the adhesive film, and The lower protective film may be removed from the adhesive film by a lower protective film removing device before the adhesive film is transferred to the second compression roller.

The method may further include retrieving the four-layer membrane electrode assembly integrated with the adhesive film, which is manufactured through the adhesive film attachment step, by winding the four-layer membrane electrode assembly around a first rewinder as the first rewinder rotates.

The non-adhesive region and the adhesive region may be partially exposed when the first upper protective film is removed, the raw material of the adhesive film may be wound and prepared in a state in which the lower protective film is exposed to the outside of the third unwinder so that the upper protective film is hidden inside the raw material of the adhesive film, and the lower protective film may be removed from the adhesive film as the lower protective film is retrieved by a protective film retrieving rewinder before the adhesive film is transferred to the second compression roller.

In an aspect, provided is a method of manufacturing an insert for a cell frame integrated with an adhesive film. The method includes: a step of preparing a three-layer membrane electrode assembly including a first electrode and a second electrode, by joining the first electrode and the second electrode, respectively, to two opposite surfaces of an electrolyte membrane, and joining a first gas diffusion layer to the first electrode; a step of attaching an adhesive film to the three-layer membrane electrode assembly by preparing an adhesive film by attaching an upper protective film, which includes a first upper protective film provided at an inner side thereof and a second upper protective film provided outside the first upper protective film based on a cutting line, to an upper surface of the adhesive film and attaching a lower protective film to a lower surface of the adhesive film, the adhesive film including a non-adhesive region provided at an inner side thereof and an adhesive region provided outside the non-adhesive region, removing the lower protective film, and attaching the adhesive film to an outer periphery of the membrane electrode assembly comprising the second electrode; a step of retrieving a four-layer membrane electrode assembly by integrating the adhesive film and the three-layer membrane electrode assembly; a step of supplying the retrieved four-layer membrane electrode assembly by integrating the adhesive film to an insert manufacturing apparatus and exposing a part of the adhesive region by removing the first upper protective film; a step of joining a second gas diffusion layer to the exposed part of the adhesive region; and a step of manufacturing an insert for a cell frame by punching the membrane electrode assembly into a preset size.

The joining the first gas diffusion layer may include: supplying the three-layer membrane electrode assembly from a first unwinder around which a raw material of the three-layer membrane electrode assembly is wound, and supplying the first gas diffusion layer from a second unwinder around which a raw material of the first gas diffusion layer is wound; applying a binder onto the first gas diffusion layer supplied from the second unwinder; and joining the first gas diffusion layer and the three-layer membrane electrode assembly by a first compression roller.

The step of attaching the adhesive film attachment to the three-layer membrane electrode may include: supplying the adhesive film from a third unwinder around which a raw material of the adhesive film is wound; removing the lower protective film from the raw material of the adhesive film supplied from the third unwinder and transferring the adhesive film to a second compression roller; and attaching, by the second compression roller, the adhesive film, from which the lower protective film is removed, to an outer peripheral region of the membrane electrode assembly including the second electrode. The retrieving of the four-layer membrane electrode assembly integrated with the adhesive film may retrieve the four-layer membrane electrode assembly integrated with the adhesive film manufactured through the adhesive film attachment step by winding the four-layer membrane electrode assembly around a first rewinder as the first rewinder rotates.

The raw material of the adhesive film may be wound and prepared in a state in which the lower protective film is exposed to the outside of the third unwinder so that the upper protective film is hidden inside the raw material of the adhesive film. The lower protective film may be removed from the adhesive film as the lower protective film is retrieved by a protective film retrieving rewinder before the adhesive film is transferred to the second compression roller.

The joining of the second gas diffusion layer may include: preparing the second gas diffusion layer formed in advance by blanking in accordance with sizes of the non-adhesive region and the exposed part of the adhesive region; and attaching an outer peripheral portion of the second gas diffusion layer to the exposed part of the adhesive region.

In another aspect, provided is a method of manufacturing a cell frame for a fuel cell. The method includes: preparing an elastic frame and the insert for a cell frame comprising the adhesive film manufactured as described herein; exposing the remaining adhesive region by removing the second upper protective film from the insert for a cell frame; and joining the elastic frame and the insert for a cell frame.

In further aspect, provided is a four-layer membrane electrode assembly including an adhesive film. The four-layer membrane electrode assembly includes: an electrolyte membrane; a first electrode formed on a lower surface of the electrolyte membrane; a second electrode formed on an upper surface of the electrolyte membrane; a first gas diffusion layer joined to the first electrode; and an adhesive film joined to the second electrode and having an upper surface to which an upper protective film is attached, in which the adhesive film includes a non-adhesive region provided at an inner side thereof and an adhesive region provided outside the non-adhesive region, in which the upper protective film includes a first upper protective film provided at an inner side thereof and a second upper protective film provided outside the first upper protective film based on a cutting line, and in which the non-adhesive region and the adhesive region of the adhesive film are partially exposed when the first upper protective film is removed.

The adhesive region of the adhesive film may be a closed region extending along an outer periphery of the non-adhesive region, and the adhesive region may include a first adhesive region covered by the first upper protective film, and a second adhesive region covered by the second upper protective film.

The adhesive film may be configured such that a bonding force applied to the lower protective film is lower than a bonding force applied to the upper protective film.

A width of the second upper protective film may be less than a width of the adhesive region at a position corresponding to the second upper protective film.

In yet another aspect, provided is an insert for a cell frame integrated with an adhesive film. The insert may be manufactured by joining a second gas diffusion layer to the exposed part of the adhesive region in a state in which the first upper protective film of the four-layer membrane electrode assembly integrated with the adhesive film having the above-mentioned configuration is removed.

Further, in an aspect, provided is a cell frame for a fuel cell. The cell frame includes the insert integrated with the adhesive film as described herein. The cell frame may be manufactured by removing the second upper protective film from the insert for a cell frame integrated with the adhesive film having the above-mentioned configuration and joining an elastic frame to the remaining exposed adhesive region.

According to the insert for a cell frame integrated with an adhesive film and the method of manufacturing a cell frame using the same according to various exemplary embodiments of the present invention, the process of continuously attaching the adhesive film may be applied to the roll lamination process of manufacturing the membrane electrode assembly, such that the insert integrated with the adhesive film may be effectively produced in the single process. Therefore, it is possible to mass-produce the insert for a cell frame.

In addition, according to various exemplary embodiments of the present invention, the insert to which the adhesive film is attached in advance may be used instead of a method in the related art of attaching gas diffusion layers (GDLs), onto which a binder is applied, to two opposite surfaces of a three-layer membrane electrode assembly (MEA) to manufacture an insert (5-Layer MEA). As such, the five-layer type insert may be manufactured without applying the binder onto the upper gas diffusion layer (GDL).

According to various exemplary embodiments of the present invention, all the cell frame processes may be automated. Therefore, it is possible to solve problems such as bubbles, wrinkles, and separation caused when the adhesive film is manually attached to the elastic frame. Further, sealability may be ensured by increasing the bonding force between the elastic frame and the insert.

In addition, according to various exemplary embodiments of the present invention, the insert integrated with adhesive film has the upper protective film, and the exposure of the adhesive film to the outside may be prevented and storing and carrying the insert and ensure production inventories may be easy.

Other aspects of the invention are disclosed infra.

BRIEF DESCRIPTION OF THE DRAWINGS

FIGS. 2A and 2B show an exemplary adhesive film used for a membrane electrode assembly insert integrated with an adhesive film according to an exemplary embodiment of the present invention, in which

DETAILED DESCRIPTION

First, a cell frame applied to a unit cell will be described before describing exemplary embodiments of the present invention.

The cell frame includes an insert for a cell frame including: a three-layer membrane electrode assembly including an electrolyte membrane, an anode electrode, and a cathode electrode; and a pair of gas diffusion layers disposed on two opposite surfaces of the membrane electrode assembly. In addition, the cell frame includes an elastic frame integrally joined to an outer peripheral region of the insert for a cell frame by thermal bonding or the like. Further, a pair of separators may be positioned on two opposite surfaces of the elastic frame integrated with the three-layer membrane electrode assembly and the pair of gas diffusion layers and each have flow paths (flow fields) for supplying reactant gases and discharging produced water generated by reactions.

In the related art, the insert is an assembly made by laminating the three-layer membrane electrode assembly and the pair of gas diffusion layers. In particular, the insert may have a five-layer structure in which the gas diffusion layers are respectively disposed on one surface and the other surface of the membrane electrode assembly.

The elastic frame is a means integrally formed on an outer peripheral region of the insert to maintain sealability of the insert and implement convenience during a lamination process. The elastic frame may be made of a material such as a thermoplastic elastomer (TPE) so as to be joined while maintaining a predetermined shape.

In addition, the elastic frame is disposed to surround the outer peripheral region of the insert. In particular, the elastic frame may be attached to the insert to provide sealing performance by being in close contact with the electrolyte membrane and the electrodes of the insert.

Meanwhile, according to exemplary embodiments of the present invention, the insert for a cell frame integrated with the adhesive film may be manufactured, and then a process of attaching the adhesive film, a process of attaching the gas diffusion layers with the adhesive film, and a process of attaching the cell frame may be continuously performed in a single lamination process.

Hereinafter, a four-layer membrane electrode assembly integrated with an adhesive film, an insert for a cell frame integrated with an adhesive film, a structure of the cell frame using the insert, and methods of manufacturing these components according to various embodiments of the present invention will be described in detail with reference to the accompanying drawings.

Figure 1:
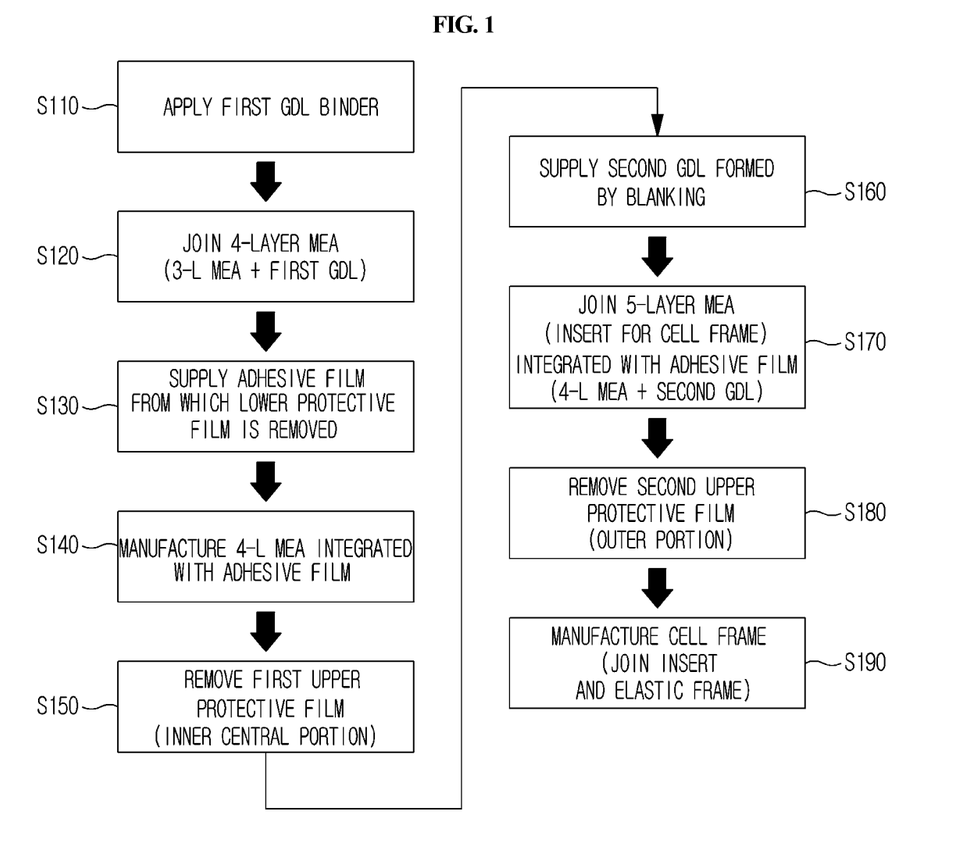
FIG. 1 shows an exemplary method of manufacturing a cell frame according to an exemplary embodiment of the present invention in a stepwise manner.

FIG. 1 shows an exemplary method of manufacturing a cell frame according to an exemplary embodiment of the present invention in a stepwise manner. In addition, FIGS. 2A and 2B show an example of an adhesive film used for a membrane electrode assembly insert integrated with an adhesive film according to an exemplary embodiment of the present invention, and FIGS. 3A to 3H show cross-sectional structures of the insert for respective steps of the method of manufacturing a cell frame according to an exemplary embodiment of the present invention.

The method of manufacturing a cell frame according to an exemplary embodiment of the present invention may broadly include a process of manufacturing the four-layer membrane electrode assembly integrated with the adhesive film (S110 to S140 in FIG. 1), a process of manufacturing the insert for a cell frame including the five-layer membrane electrode assembly integrated with the adhesive film (S150 to S170 in FIG. 1), and a process of manufacturing the cell frame by joining the elastic frame and the insert for a cell frame (S180 and S190 in FIG. 1).

Figure 2A:
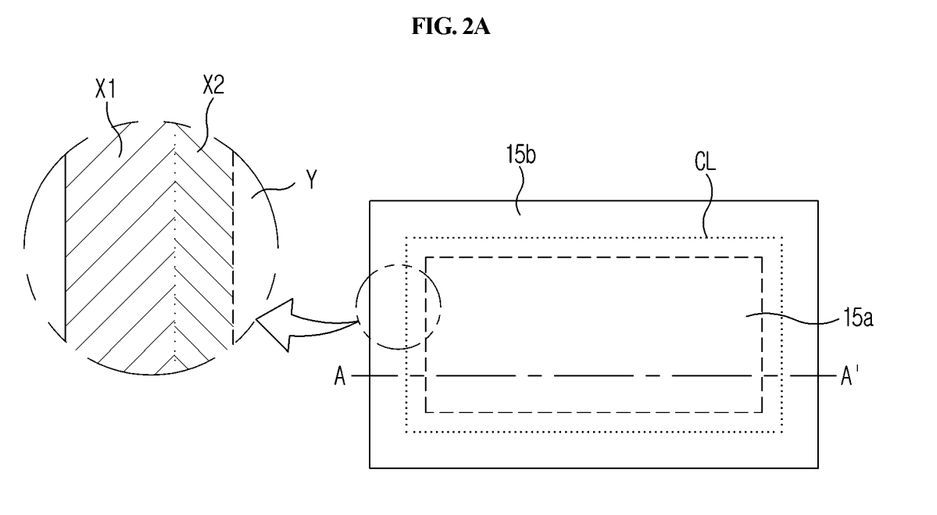
FIG. 2A is a top plan view of a raw material of the adhesive film.
Figure 2B:
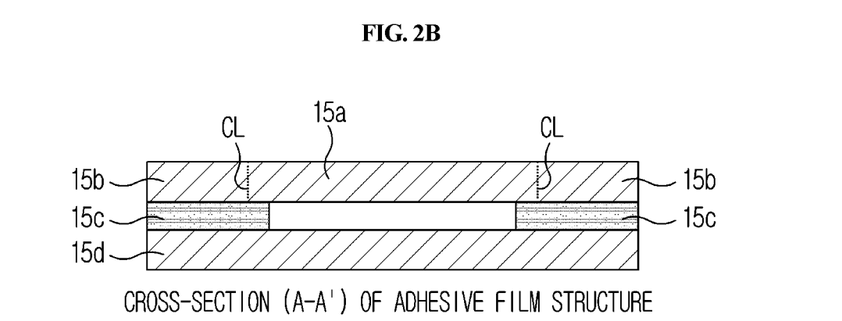
FIG. 2B is a cross-sectional view of the raw material of the adhesive film taken along line A-A'.
Figure 3:
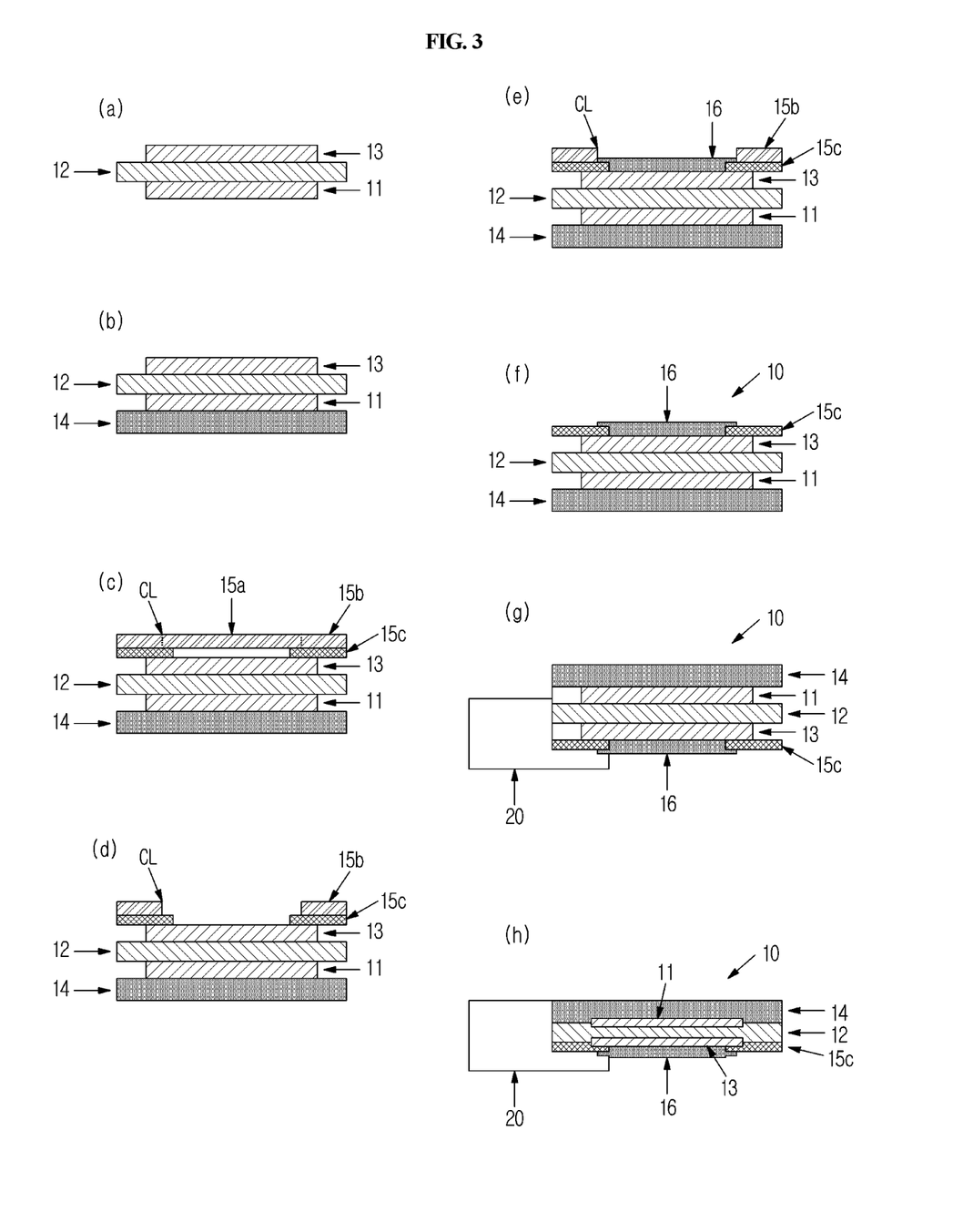
FIGS. 3A to 3H show cross-sectional structures of an exemplary insert for respective steps of the method of manufacturing a cell frame according to an exemplary embodiment of the present invention.

In the exemplary embodiment of the present invention, the adhesive film having the structure illustrated in FIG. 2 is used to attach the gas diffusion layer and the elastic frame. In particular, the adhesive film applied to the insert for a cell frame according to the exemplary embodiment of the present invention may be implemented to manufacture the insert through a roll lamination process using a continuous roll-to-roll method.

For example, FIG. 2A shows a top plan view schematically illustrating a configuration of a raw material of the adhesive film capable of being used to configure a single cell, and FIG. 2B is a cross-sectional view taken along line A-A' in FIG. 2A.

The adhesive film illustrated in FIGS. 2A and 2B may be attached to one side of a second electrode 13 of the four-layer membrane electrode assembly (including a first gas diffusion layer, a first electrode, an electrolyte membrane, and the second electrode), and a second gas diffusion layer 16 and an elastic frame 20 are attached to the other side. As shown in FIGS. 2A and 2B, the adhesive film 15$c$ may include a non-adhesive region Y provided at an inner side thereof, adhesive regions X1 and X2 provided outside the non-adhesive region Y. In addition, upper protective films 15$a$ and 15$b$ attached to the adhesive film include a first upper protective film 15$a$ provided at an inner side thereof and a second upper protective film 15$b$ provided outside the first upper protective film 15$a$ based on a cutting line CL. When the first upper protective film 15$a$ is removed, the non-adhesive region Y and the adhesive region X2 of the adhesive film 15$c$ may be exposed. The cutting line CL may be formed in advance on the upper protective film by half blanking or the like. The upper protective film may include an inner portion and an outer portion, and the inner portion and the outer portion may be sequentially removed as necessary. In this regard, a width of the outer portion of the upper protective film, i.e., the second upper protective film 15$b$ is less than a width of the adhesive film 15$c$, such that the gas diffusion layer may be attached to the adhesive film 15$c$ by the adhesive region X2 on a part of an outer periphery of the adhesive film 15$c$ when joining the gas diffusion layer.

As shown in FIGS. 2A and 2B, the non-adhesive region Y of the adhesive film 15$c$ is a vacant region in which the second gas diffusion layer 16 may be seated at a center in the adhesive film 15$c$. The adhesive regions X1 and X2 are regions positioned outside the non-adhesive region Y, i.e., substantial regions of the adhesive film.

As shown in FIG. 2A, the adhesive region may be a closed region extending along an outer periphery of the non-adhesive region. As shown in FIG. 2B, the adhesive region may include the first adhesive region X2 covered by the first upper protective film 15$a$, and the second adhesive region X1 covered by the second upper protective film 15$b$.

In addition, based on a single cell, a lower protective film 15$d$ may be a single release film. When the lower protective film 15$d$ is removed, a lower adhesive surface of the adhesive film 15$c$ may be exposed.

Meanwhile, bonding forces between the protective films and the adhesive film may be different from one another in the order in which the protective films are removed. For example, the bonding force applied to the lower protective film 15$d$ may be lower than the bonding force applied to the upper protective film. In particular, the upper protective film and the adhesive film may not separate from each other during the process of removing the lower protective film 15$d$.

Likewise, the width of the second upper protective film 15$b$ may be less than a width of the adhesive region at a position corresponding to the second upper protective film 15$b$.

Since the width of the second upper protective film 15$b$ is small as described above, a part of the adhesive region of the adhesive film 15$c$ may be exposed as the first upper protective film 15$a$ is removed, and the second gas diffusion layer 16 may be joined through the exposed part of the adhesive region.

Meanwhile, FIGS. 3A to 3H are views illustrating cross-sectional structures of the insert for respective steps of the method of manufacturing a cell frame according to an exemplary embodiment of the present invention. Hereinafter, the method of manufacturing a cell frame according to the exemplary embodiment of the present invention will be described in detail with reference to FIGS. 1 and 3.

FIG. 3A shows a cross-section of the three-layer membrane electrode assembly in which a first electrode 11 and a second electrode 13 are respectively joined to two opposite surfaces of the electrolyte membrane 12. In a state in which the three-layer membrane electrode assembly having the cross-sectional structure described above and a first gas diffusion layer 14 are prepared, the four-layer membrane electrode assembly (three-layer MEA+first GDL) may be formed by applying a binder onto one surface of the first gas diffusion layer 14 (S110) and joining the first gas diffusion layer 14 to the first electrode 11 (S120). FIG. 3B shows a cross-section of the four-layer membrane electrode assembly manufactured through the above-mentioned process. For example, the configuration has been described in which the first electrode 11 is the cathode, the second electrode 13 is the anode, the first gas diffusion layer 14 is the cathode side gas diffusion layer, and the second gas diffusion layer 16 is the anode side gas diffusion layer, but this configuration is just an example. Therefore, as another example of the present invention, the anode and the cathode may be provided in a reverse way.

Further, as illustrated in FIG. 2, the adhesive film to which the upper protective film and the lower protective film are attached may be prepared, and the adhesive film from which the lower protective film is removed may be supplied to a production facility (S130).

The four-layer membrane electrode assembly integrated with the adhesive film is manufactured as the adhesive film from which the lower protective film is removed is attached to the four-layer membrane electrode assembly manufactured in the previous step S120 (S140). In this regard, FIG. 3C shows a cross-sectional structure of the four-layer membrane electrode assembly integrated with the adhesive film. Since the four-layer membrane electrode assembly integrated with the adhesive film in the present step S140 is in a state in which only the lower protective film is removed, the upper protective film is still attached to the adhesive film and protects the adhesive region of the adhesive film. Therefore, the four-layer membrane electrode assembly integrated with the adhesive film manufactured in the present step is easy to store and carry.

Thereafter, a step of removing the first upper protective film of the inner central portion of the upper protective film is performed (S150). In particular, a cross-sectional structure of the present step is illustrated in FIG. 3D, and an internal space for accommodating the second gas diffusion layer is exposed from an inner central portion of the membrane electrode assembly.

Next, the second gas diffusion layer may be provided by being cut into a size of the first upper protective film, i.e., manufactured, by blanking, to have a size that enables the second gas diffusion layer to be joined to the exposed adhesive region of the adhesive film (S160), and a step of attaching the second gas diffusion layer to a surface including a reaction region of the four-layer membrane electrode assembly to which the adhesive film is attached is performed (S170). FIG. 3E illustrates the insert 10 for a cell frame corresponding to the five-layer membrane electrode assembly manufactured in the above-mentioned step S170. In particular, the second upper protective film 15b may be still attached to an outer peripheral edge of the insert 10 for a cell frame, which is the manufactured five-layer membrane electrode assembly (including the first gas diffusion layer, the first electrode, the electrolyte membrane, the second electrode, the second gas diffusion layer, and the adhesive film), and still protects the region of the adhesive film to which the elastic frame 20 may be to be attached. In addition, the present step may include a process cutting the insert for a cell frame to meet the predetermined specification by punching. The plurality of inserts made by punching in accordance with the specification may be moved while being accommodated in an insert lamination cartridge 508 so as to be joined to the elastic frame 20 during the process.

Thereafter, the second upper protective film is removed (S180), the exposed adhesive film may be laminated on the elastic frame so as to be in contact with the elastic frame, and the elastic frame 20 and the insert 10 may be integrally joined by a process such as a hot-pressing process, such that the cell frame may be manufactured (S190). FIG. 3F illustrates a cross-sectional structure of the insert from which the second upper protective film is removed in step S180. FIG. 3G shows a cross-sectional structure of the cell frame made by integrally laminating the elastic frame 20 and the insert 10 for a cell frame. In addition, FIG. 3H shows a cross-sectional structure of the final cell frame made by joining the elastic frame 20 and the insert 10 for a cell frame by a hot-pressing process. As shown in FIG. 3H, the adhesive film may be tightly joined and attached to the outer peripheral region of the membrane electrode assembly including the second electrode of the five-layer electrolyte membrane assembly by compression rollers and the hot-pressing process, such that pores of the cross-sectional structure are eliminated. Therefore, the insert 10 for a cell frame may be compressed by the compression rollers and the hot-pressing process and joined to the adhesive film without pores.

Regarding the exemplary embodiment of the method of manufacturing the cell frame described above, FIGS. 4 and 5 illustrate an example of a continuous process of manufacturing the four-layer membrane electrode assembly and the five-layer membrane electrode assembly (the insert for a cell frame) through a roll-to-roll type roll lamination process.

As shown in FIG. 1, the method of manufacturing a cell frame according to the exemplary embodiment of the present invention may broadly include the process of manufacturing the four-layer membrane electrode assembly integrated with the adhesive film (S110 to S140 in FIG. 1), the process of manufacturing the insert for a cell frame including the five-layer membrane electrode assembly integrated with the adhesive film (S150 to S170 in FIG. 1), and the process of manufacturing the cell frame by joining the elastic frame and the insert for a cell frame (S180 and S190 in FIG. 1).

According to various exemplary embodiment of the present invention, a roll-to-roll type roll lamination apparatus may be basically used as an apparatus for manufacturing a cell frame. In particular, unwinders around which raw materials to be laminated are wound are prepared in advance, the respective layers are attached while passing through sub rollers such as the compression rollers, and then the manufactured raw material may be finally retrieved by a rewinder. The rewinder may be controlled to apply appropriate tension to the respective raw materials to be laminated. Because the operational principle and the like of the roll-to-roll type roll lamination apparatus is a well-known technology, detailed descriptions of the specific functions and operations of the respective components in the facility will be omitted from the present specification.

Figure 4:
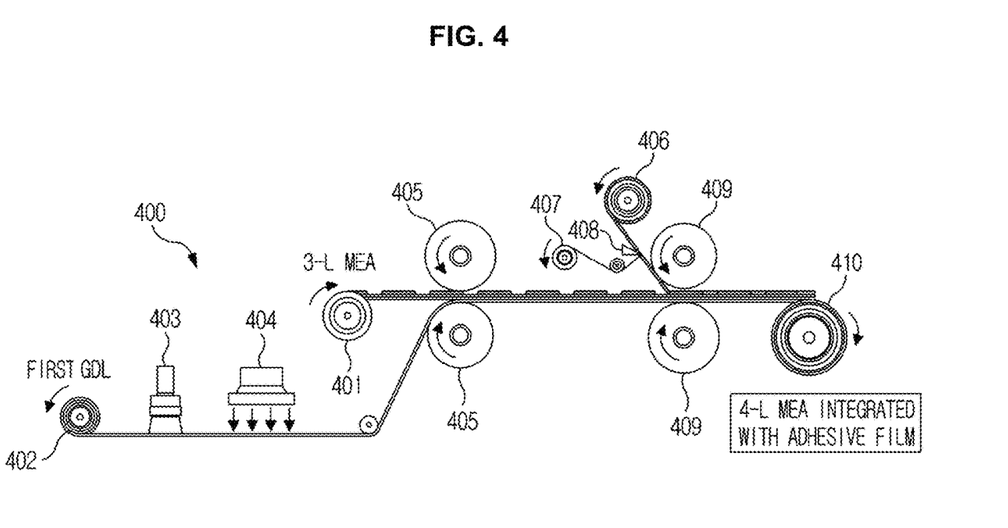
FIG. 4 shows an exemplary roll lamination apparatus for explaining a process of manufacturing a membrane electrode assembly insert having a four-layer structure attached with an adhesive film in the method of manufacturing a cell frame according to an exemplary embodiment of the present invention.
Figure 5:
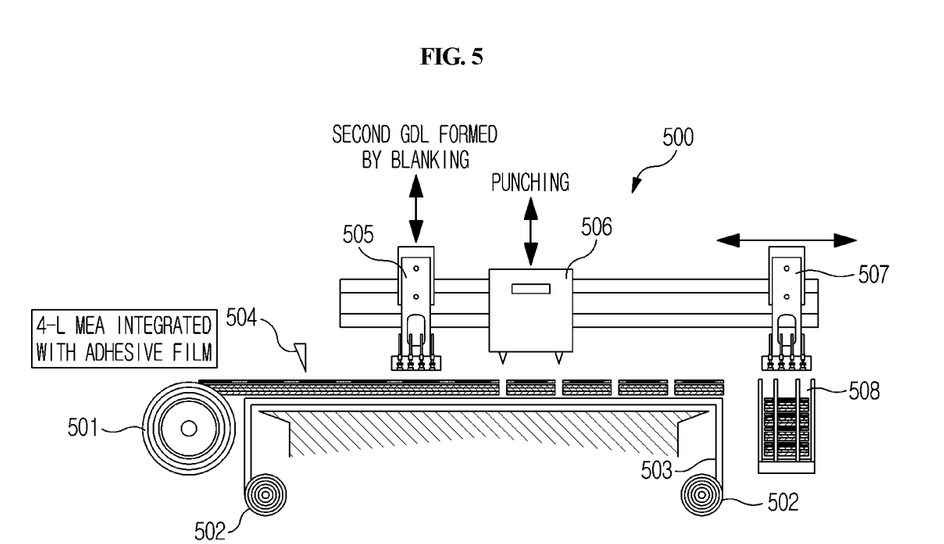
FIG. 5 shows an exemplary apparatus for manufacturing an insert for a cell frame integrated with an adhesive film having a five-layer structure using the membrane electrode assembly insert having the four-layer structure manufactured by the apparatus illustrated in FIG. 4.

For example, FIG. 4 illustrates the process of manufacturing the four-layer membrane electrode assembly integrated with the adhesive film (S110 to S140 in FIG. 1). FIG. 5 shows the process of manufacturing insert for a cell frame including the five-layer membrane electrode assembly integrated with the adhesive film (S150 to S170 in FIG. 1).

As shown in FIG. 4, in order to manufacture the four-layer membrane electrode assembly integrated with the adhesive film first to manufacture the cell frame, the three-layer membrane electrode assembly in which the first electrode 11 and the second electrode 13 are joined to the two opposite surfaces of the electrolyte membrane 12 may be prepared. Further, a first unwinder 401 around which the raw material of the three-layer membrane electrode assembly is wound may be disposed in the facility, and the three-layer membrane electrode assembly to be laminated may be supplied from the first unwinder 401.

A second unwinder 402 around which the raw material of the first gas diffusion layer 14 is wound may be prepared at the other side of the facility, and the raw material of the first gas diffusion layer 14 may be supplied into the facility as the second unwinder 402 rotates.

In addition, a binder application device 403 for applying the binder may be installed on a supply line for the first gas diffusion layer, and the applied binder is dried by the dryer 404 and then moved to a position at which the binder may be joined to the three-layer membrane electrode assembly.

As shown in FIG. 4, the first gas diffusion layer onto which the binder is applied may be laminated on the three-layer membrane electrode assembly by first compression rollers 405. The first compression rollers 405 may be a pair of rollers that rotates in opposite directions. Further, the first compression rollers 405 may integrally join the first gas diffusion layer and the three-layer membrane electrode assembly while rotating.

The adhesive film to which the protective film may be attached is supplied into the facility, and the adhesive film may be attached to manufacture the membrane electrode assembly integrated with adhesive film. To this end, a third unwinder 406 around which a raw material of the adhesive film is wound may be prepared, as shown in FIG. 4. The raw material of the adhesive film wound around the third unwinder 406 may be provided in a state in which the upper protective film and the lower protective film are respectively attached to upper and lower surfaces of the raw material of the adhesive film. As described above, the adhesive film includes the non-adhesive region provided at the inner side and the adhesive region provided outside the non-adhesive region. The upper protective film includes the first upper protective film provided at the inner side and the second upper protective film provided outside the first upper protective film based on the cutting line CL. In addition, the raw material of the adhesive film may be wound and prepared in a state in which the lower protective film is exposed to the outside of the third unwinder 406 so that the upper protective film is hidden inside the raw material of the adhesive film.

A lower protective film removing device for removing the lower protective film may be provided at a downstream side of the third unwinder 406. As shown in FIG. 4, the lower protective film removing device may include a protective film retrieving rewinder 407 for winding and removing the lower protective film, and a guide roller for guiding the lower protective film. In addition, the lower protective film removing device 408 may remove the lower protective film from the adhesive film. Therefore, the lower protective film may be removed from the adhesive film by the lower protective film removing device 408 before the adhesive film is transferred to second compression rollers 409. The lower protective film may be removed from the adhesive film by being retrieved by the protective film retrieving rewinder 407.

The adhesive film from which only the lower protective film is selectively removed by the lower protective film removing device is transferred to the second compression roller 409. The second compression rollers 409 may attach the adhesive film, from which the lower protective film is removed, to the second electrode 13 of the four-layer membrane electrode assembly to which the first gas diffusion layer manufactured in the previous steps is attached.

The four-layer membrane electrode assembly, to which the adhesive film is integrally attached as the four-layer membrane electrode assembly and the adhesive film pass through the second compression rollers 409, may be retrieved by being wound around the first rewinder as the first rewinder rotates.

As such, the four-layer membrane electrode assembly integrated with the adhesive film is manufactured by the apparatus as shown in FIG. 4. Since the adhesive region of the adhesive film of the manufactured four-layer membrane electrode assembly integrated with the adhesive film is still protected by the upper protective film, the four-layer membrane electrode assembly may be transferred in a wound state.

The method of manufacturing an insert for a cell frame integrated with an adhesive film according to an exemplary embodiment of the present invention may manufacture the insert for a cell frame integrated with the adhesive film having the five-layer layered structure by using the four-layer membrane electrode assembly integrated with the adhesive film manufactured by the apparatus illustrated in FIG. 4.

As shown in to FIG. 5, a winding roll around which the retrieved four-layer membrane electrode assembly integrated with the adhesive film is wound operates as an unwinder in an apparatus illustrated in FIG. 5. The unwinder illustrated in FIG. 5 is referred to as a fourth unwinder 501. In addition, a joint/punching assisting film 503, a support, and conveying rollers 502 may be installed at a lower side of the facility to provide power for transferring the membrane electrode assembly and assist the joint and punching processes.

As shown in FIG. 5, a first upper protective film removing device 504 may remove the first upper protective film from the inner central portion of the four-layer membrane electrode assembly integrated with the adhesive film supplied from the fourth unwinder 501. The first upper protective film removing device may be any device as long as the device may selectively remove only the first upper protective film. For example, the first upper protective film removing device may be a robot arm capable of sucking the protective film.

When the first upper protective film is removed by the first upper protective film removing device, a part of the adhesive region may be exposed, and the second gas diffusion layer may be joined to the exposed part of the adhesive region. To this end, a second gas diffusion layer supply device 505 may be provided to supply the second gas diffusion layer, which is formed in advance to have a required size by blanking, into the facility. The second gas diffusion layer supply device 505 may sequentially supply the second gas diffusion layer continuously formed by blanking and attach the second gas diffusion layer to a predetermined position while moving upward or downward.

When the membrane electrode assembly having the five-layer structure is manufactured by attaching the second gas diffusion layer, the membrane electrode assembly is transferred to a punching device 506 so as to be cut into a preset size.

The punching device 506 may punch the five-layer membrane electrode assembly into a preset size, such that the insert for a cell frame may be manufactured in a shape usable for the unit cell. An unloading device 507 may be installed in a final section of the facility, the unloading device 507 may retrieve the respective inserts for a cell frame and moves the inserts for a cell frame to an insert stacking cartridge 508, such that the inserts may be stacked and accommodated in the insert stacking cartridge 508. In particular, the second upper protective film is still attached to the insert. Therefore, the remaining adhesive region of the adhesive film, which is used to attach and fix the elastic frame, may be still kept protected by the second upper protective film.

Figure 6:
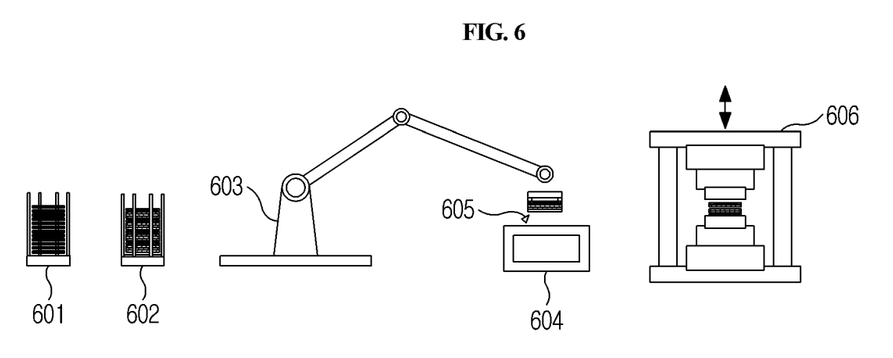
FIG. 6 shows an exemplary apparatus for manufacturing an exemplary cell frame using the insert for a cell frame integrated with an adhesive film having the five-layer structure manufactured by the apparatus illustrated in FIG. 5.

The inserts for a cell frame, which are finally manufactured by the apparatus illustrated in FIG. 5, are transferred to a process step of manufacturing the cell frame, and the cell frame to be stacked on the single cell is finally manufactured by joining the elastic frame to the insert. FIG. 6 shows an exemplary apparatus for manufacturing a final cell frame using the insert for a cell frame integrated with an adhesive film having the five-layer structure manufactured by the apparatus illustrated in FIG. 5.

As shown in FIG. 6, the elastic frame 20 may be prepared in an elastic frame stacking cartridge 601, and the insert 10 for a cell frame may be also prepared in an insert stacking cartridge 602. The elastic frame 20 may be seated on a press 606 by an automatic transfer robot 603 after being subjected to a vision insert alignment inspection performed by a vision inspection device 604. During the process of performing the vision alignment inspection on the insert 10 for a cell frame, a film removing device 605 may remove the second upper protective film from the outer portion, and the insert may be stacked on the elastic frame 20 so that the adhesive film is in close contact with the elastic frame. In particular, the elastic frame and the insert for a cell frame may be joined by a hot-pressing process using the press 606, and the cell frame may be manufactured by the hot-pressing process.

When the cell frame production facility is implemented using the apparatuses illustrated in FIGS. 4 and 5 as described above, it is possible to mass-produce the four-layer membrane electrode assembly integrated with the adhesive film and the insert for a cell frame which are used to manufacture the cell frame through the continuous roll lamination process, such that it is possible to mass-produce the cell frame integrated formed with the elastic frame.

Further, a method of manufacturing a cell frame for a fuel cell includes: preparing the elastic frame and the insert for a cell frame integrated with the adhesive film manufactured through the previous processes; exposing the remaining adhesive region by removing the second upper protective film from the insert for a cell frame; and joining the elastic frame and the insert for a cell frame.

While the exemplary embodiments of the present invention have been illustrated and described, it will be obvious to those skilled in the art that the present invention may be variously modified and changed without departing from the technical spirit of the present invention defined in the appended claims.

What is claimed is:

1. A method of manufacturing a four-layer membrane electrode assembly integrated with an adhesive film, the method comprising:
   a step of preparing a three-layer membrane electrode assembly comprising a first electrode and a second electrode, comprising:
      attaching the first electrode to a first surface of an electrolyte membrane,
      attaching the second electrode to a second surface of the electrolyte membrane, and
      joining a first gas diffusion layer to the first electrode; and
   a step of attaching an adhesive film to the three-layer membrane electrode assembly, comprising:
      preparing the adhesive film by attaching an upper protective film to an upper surface of the adhesive film and a lower protective film to a lower surface of the adhesive film,
      removing the lower protective film, and
      attaching the adhesive film to an outer peripheral region of the membrane electrode assembly comprising the second electrode,
   wherein the adhesive film comprises a non-adhesive region provided at an inner side thereof and an adhesive region provided outside the non-adhesive region,
   wherein the upper protective film comprises a first upper protective film provided at an inner side, and a second upper protective film provided outside the first upper protective film based on a cutting line, and
   wherein the non-adhesive region and the adhesive region of the adhesive film are partially exposed when the first upper protective film is removed.

2. The method of claim 1, wherein the joining the first gas diffusion layer to the first electrode comprises:
   supplying the three-layer membrane electrode assembly from a first unwinder around which a raw material of the three-layer membrane electrode assembly is wound, and supplying the first gas diffusion layer from a second unwinder around which a raw material of the first gas diffusion layer is wound;
   applying a binder onto the first gas diffusion layer supplied from the second unwinder; and
   joining the first gas diffusion layer and the three-layer membrane electrode assembly by a first compression roller.

3. The method of claim 1, wherein the step of attaching the adhesive film to the three-layer membrane electrode assembly comprises:
   supplying the raw material of the adhesive film from a third unwinder around which a raw material of the adhesive film is wound;
   removing the lower protective film from the raw material of the adhesive film supplied from the third unwinder and transferring the adhesive film to a second compression roller; and
   attaching, by the second compression roller, the adhesive film, from which the lower protective film is removed, to an outer peripheral region of the membrane electrode assembly comprising the second electrode.

4. The method of claim 3,
   wherein the raw material of the adhesive film is wound and prepared in a state in which the lower protective film is exposed to the outside of the third unwinder so that the upper protective film is hidden inside the raw material of the adhesive film, and
   wherein the lower protective film is removed from the adhesive film by a lower protective film removing device before the adhesive film is transferred to the second compression roller.

5. A method of manufacturing an insert for a cell frame integrated with an adhesive film, the method comprising:
   a step of preparing a three-layer membrane electrode assembly comprising a first electrode and a second electrode comprising:
      joining the first electrode and the second electrode, respectively, to two opposite surfaces of an electrolyte membrane and
      joining a first gas diffusion layer to the first electrode;
   a step of attaching an adhesive film to the three-layer membrane electrode assembly comprising:
      preparing an adhesive film by attaching an upper protective film comprising a first upper protective film provided at an inner side thereof and a second upper protective film provided outside the first upper protective film based on a cutting line to an upper surface and attaching a lower protective film to a lower surface, the adhesive film comprising a non-adhesive region provided at an inner side thereof and an adhesive region provided outside the non-adhesive region,
      removing the lower protective film, and
      attaching the adhesive film to the second electrode;
   a step of retrieving a four-layer membrane electrode assembly by integrating the adhesive film and the three-layer membrane electrode assembly;
   a step of supplying the retrieved four-layer membrane electrode assembly by integrating the adhesive film to an insert manufacturing apparatus and exposing a part of the adhesive region by removing the first upper protective film, wherein the non-adhesive region and the adhesive region of the adhesive film are partially exposed when the first upper protective film is removed;
   a step of joining a second gas diffusion layer to the exposed part of the adhesive region; and
   a step of manufacturing an insert for a cell frame by punching the membrane electrode assembly into a preset size.

6. The method of claim 5, wherein the joining the first gas diffusion layer comprises:
   supplying the three-layer membrane electrode assembly from a first unwinder around which a raw material of the three-layer membrane electrode assembly is wound, and supplying the first gas diffusion layer from a second unwinder around which a raw material of the first gas diffusion layer is wound;
   applying a binder onto the first gas diffusion layer supplied from the second unwinder; and
   joining the first gas diffusion layer and the three-layer membrane electrode assembly by a first compression roller.

7. The method of claim 5, wherein the step of attaching the adhesive film to the three-layer membrane electrode assembly comprises:

supplying the raw material of the adhesive film from a third unwinder around which a raw material of the adhesive film is wound;

removing the lower protective film from the raw material of the adhesive film supplied from the third unwinder and transferring the adhesive film to a second compression roller; and attaching, by the second compression roller, the adhesive film, from which the lower protective film is removed, to an outer peripheral region of the membrane electrode assembly comprising the second electrode, and wherein the retrieving of the four-layer membrane electrode assembly integrated with the adhesive film comprises winding the four-layer membrane electrode assembly around a first rewinder as the first rewinder rotates.

8. The method of claim 7, wherein the raw material of the adhesive film is wound and prepared in a state in which the lower protective film is exposed to the outside of the third unwinder so that the upper protective film is hidden inside the raw material of the adhesive film, and wherein the lower protective film is removed from the adhesive film as the lower protective film is retrieved by a protective film retrieving rewinder before the adhesive film is transferred to the second compression roller.

9. The method of claim 5, wherein the raw material of the adhesive film is wound and prepared in a state in which the lower protective film is exposed to the outside of the third unwinder so that the upper protective film is hidden inside the raw material of the adhesive film, and wherein the lower protective film is removed from the adhesive film by a lower protective film removing device before the adhesive film is transferred to the second compression roller.

10. The method of claim 5, wherein the joining of the second gas diffusion layer comprises:

preparing the second gas diffusion layer formed in advance by blanking in accordance with sizes of the non-adhesive region and the exposed part of the adhesive region; and attaching an outer peripheral portion of the second gas diffusion layer to the exposed part of the adhesive region.

11. A four-layer membrane electrode assembly integrated with an adhesive film, comprising:

an electrolyte membrane;

a first electrode formed on a lower surface of the electrolyte membrane;

a second electrode formed on an upper surface of the electrolyte membrane;

a first gas diffusion layer joined to the first electrode; and an adhesive film joined to the second electrode and having an upper surface to which an upper protective film is attached, wherein the adhesive film comprises a non-adhesive region provided at an inner side thereof and an adhesive region provided outside the non-adhesive region, wherein the upper protective film comprises a first upper protective film provided at an inner side thereof and a second upper protective film provided outside the first upper protective film based on a cutting line, and wherein the non-adhesive region and the adhesive region of the adhesive film are partially exposed when the first upper protective film is removed.

12. The four-layer membrane electrode assembly of claim 11, wherein the adhesive region of the adhesive film is a closed region extending along an outer periphery of the non-adhesive region, and the adhesive region comprises a first adhesive region covered by the first upper protective film, and a second adhesive region covered by the second upper protective film.

13. The four-layer membrane electrode assembly of claim 11, wherein the adhesive film is attached to the second electrode in a state in which a lower protective film attached in advance to a lower surface of the adhesive film is removed, and wherein the adhesive film is configured such that a bonding force applied to the lower protective film is lower than a bonding force applied to the upper protective film.

14. The four-layer membrane electrode assembly of claim 11, wherein a width of the second upper protective film is less than a width of the adhesive region at a position corresponding to the second upper protective film.

* * * * *